(12) United States Patent
Sakai

(10) Patent No.: US 8,517,130 B2
(45) Date of Patent: Aug. 27, 2013

(54) DRIVE UNIT FOR MOVABLE MEMBER

(75) Inventor: Morio Sakai, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 560 days.

(21) Appl. No.: 12/726,393

(22) Filed: Mar. 18, 2010

(65) Prior Publication Data

US 2010/0243351 A1    Sep. 30, 2010

(30) Foreign Application Priority Data

Mar. 25, 2009  (JP) ................................ 2009-074668

(51) Int. Cl.
  *B60K 11/08*    (2006.01)
(52) U.S. Cl.
  USPC ................. 180/68.1; 180/68.3; 296/193.1
(58) Field of Classification Search
  USPC ............... 180/68.1, 68.3; 296/193.1
  See application file for complete search history.

(56) References Cited

U.S. PATENT DOCUMENTS

| | | | | |
|---|---|---|---|---|
| 1,950,792 A | * | 3/1934 | Green ........................ | 165/98 |
| 3,792,889 A | * | 2/1974 | Fuener et al. ................. | 293/115 |
| 4,124,066 A | * | 11/1978 | Taylor ........................ | 165/98 |
| 4,410,032 A | * | 10/1983 | Mori .......................... | 165/44 |
| 4,475,485 A | | 10/1984 | Sakakibara et al. | |
| 4,753,288 A | * | 6/1988 | Harvey ....................... | 165/98 |
| 4,779,577 A | * | 10/1988 | Ritter et al. .................. | 123/41.05 |
| 5,209,285 A | * | 5/1993 | Joshi ......................... | 165/41 |
| 5,732,666 A | * | 3/1998 | Lee .......................... | 123/41.05 |
| 6,142,108 A | * | 11/2000 | Blichmann ................... | 123/41.05 |
| 6,588,380 B2 | * | 7/2003 | Ries-Mueller ................ | 123/41.05 |
| 6,854,544 B2 | * | 2/2005 | Vide ......................... | 180/68.6 |
| 7,498,926 B2 | * | 3/2009 | Browne et al. ................ | 340/425.5 |
| 7,644,793 B2 | * | 1/2010 | Iwasaki et al. ................ | 180/68.2 |
| 7,717,208 B2 | * | 5/2010 | Knauer ....................... | 180/68.6 |
| 7,766,111 B2 | * | 8/2010 | Guilfoyle et al. ............. | 180/68.1 |
| 7,784,576 B2 | * | 8/2010 | Guilfoyle et al. ............. | 180/68.1 |
| 7,866,737 B2 | * | 1/2011 | Browne et al. ............... | 296/193.1 |
| 8,091,516 B2 | * | 1/2012 | Preiss ........................ | 123/41.05 |
| 8,091,668 B2 | * | 1/2012 | Amano et al. ................ | 180/68.1 |

(Continued)

FOREIGN PATENT DOCUMENTS

JP    2005-041387 A    2/2005
JP      2008-6855 A    1/2008

OTHER PUBLICATIONS

Extended European Search Report issued on Jul. 26, 2010 by the European Patent Office in European Patent Application No. 10 15 6443.

(Continued)

*Primary Examiner* — Jeffrey J Restifo
(74) *Attorney, Agent, or Firm* — Buchanan Ingersoll & Rooney P.C.

(57) ABSTRACT

A drive unit for a movable member includes the movable member adjusting aerodynamic characteristics of a vehicle while the movable member is changing a position thereof, an electric motor operating the movable member, a preventing device preventing the movable member from operating beyond a specified operating range by making contact with the movable member, and a controlling device supplying an electric power to the electric motor for a reference time and operating the movable member from a first end to a second end of the specified operating range, the controlling device correcting the reference time on the basis of an external factor that affects an operating speed of the movable member.

6 Claims, 7 Drawing Sheets

(56) References Cited

U.S. PATENT DOCUMENTS

| | | | |
|---|---|---|---|
| 8,104,435 B2* | 1/2012 | Schwartz et al. | 123/41.12 |
| 8,161,919 B2* | 4/2012 | Klotz et al. | 123/41.04 |
| 8,181,727 B2* | 5/2012 | Ritz et al. | 180/68.1 |
| 2010/0071977 A1* | 3/2010 | Ritz et al. | 180/68.1 |
| 2010/0147611 A1* | 6/2010 | Amano et al. | 180/68.1 |
| 2010/0243351 A1* | 9/2010 | Sakai | 180/68.1 |
| 2010/0243352 A1* | 9/2010 | Watanabe et al. | 180/68.1 |
| 2010/0282533 A1* | 11/2010 | Sugiyama | 180/68.1 |
| 2011/0005851 A1* | 1/2011 | Doroghazi et al. | 180/68.1 |
| 2011/0137530 A1* | 6/2011 | Kerns | 701/49 |
| 2011/0226541 A1* | 9/2011 | Hori et al. | 180/68.1 |
| 2012/0019025 A1* | 1/2012 | Evans et al. | 296/193.1 |
| 2012/0022742 A1* | 1/2012 | Nemoto | 701/36 |
| 2012/0067655 A1* | 3/2012 | Charnesky et al. | 180/68.1 |
| 2012/0068498 A1* | 3/2012 | Wolf | 296/193.1 |
| 2012/0074729 A1* | 3/2012 | Fenchak et al. | 296/193.1 |
| 2012/0090906 A1* | 4/2012 | Charnesky et al. | 180/68.1 |
| 2012/0091757 A1* | 4/2012 | Tregnago et al. | 296/193.1 |
| 2012/0097464 A1* | 4/2012 | Waugh | 180/68.1 |
| 2012/0111652 A1* | 5/2012 | Charnesky et al. | 180/68.1 |
| 2012/0132474 A1* | 5/2012 | Charnesky et al. | 180/68.1 |

OTHER PUBLICATIONS

Official Action issued by Japanese Patent Office on Jun. 20, 2013 in Japanese Application No. 2009-074668, and English language translation of Official Action (5 pgs).

* cited by examiner

DRIVE UNIT FOR MOVABLE MEMBER

CROSS REFERENCE TO RELATED APPLICATIONS

This application is based on and claims priority under 35 U.S.C. §119 to Japanese Patent Application 2009-074668, filed on Mar. 25, 2009, the entire content of which is incorporated herein by reference.

TECHNICAL FIELD

This disclosure relates to a drive unit for a movable member.

BACKGROUND DISCUSSION

A known drive unit for a movable member includes the movable member adjusting aerodynamic characteristics of a vehicle while the movable member is changing its position, an electric motor operating the movable member, preventing means preventing the movable member from operating beyond a specified operating range by contacting with the movable member, and controlling means supplying an electric power to the electric motor for a reference time to thereby operate the movable member from a first end to a second end of the specified operating range.

A drive unit for a movable fin is provided at a radiator grille for a vehicle as an example of the aforementioned drive unit for the movable member. The movable fin serves as an example of the movable member adjusting aerodynamic characteristics of the vehicle while changing a position. The movable fin adjusts an air penetration to an engine compartment from a front portion of the vehicle that is being driven, thereby applying an air resistance, a lift force, or a down force to the vehicle. A stable driving state of the vehicle is thus ensured. The movable fin is rotatable within a specified operating range defined by a fully closed position (i.e., one of a first end and a second end) where the air penetration to the engine compartment is prohibited and a fully open position (i.e., the other one of the first end and the second end) where the air penetration to the engine compartment is permitted. The rotation of the movable fin beyond the specified operating range is prevented by preventing means that make contact with the movable fin. Without an installation of a sensor that detects the rotation of the movable fin from the first end to the second end of the specified operating range, the movable fin is rotatable from the first end to the second end by the power supply to the electric motor for a reference time (for example, see JP2008-6855A). However, in a case where the reference time is short, the electric motor may stop while the movable fin is rotating within the specified operating range. Therefore, in order to ensure the rotation of the movable fin from the first end to the second end of the specified operating range, the reference time while the electric motor is being powered tends to be longer than a time period actually required for the rotation of the movable fin from the first end to the second end of the specified operating range. Accordingly, even after the completion of the rotation of the movable fin from the first end to the second end, the electric motor is continuously powered until the reference time elapses.

Because the rotation of the movable fin beyond the specified operating range is prevented by the preventing means, a stress may occur in a component of the drive unit. Specifically, the stress may occur in the electric motor, the movable fin, and/or a power transmission mechanism that transmits power from the electric motor to the movable fin by means of the continuous power supply to the electric motor after the completion of the rotation of the movable fin from the first end to the second end of the specified operating range. A smooth operation of the power transmission mechanism may be prevented accordingly. A magnitude of the stress becomes greater in association with an increase of length of a time period while power is being supplied to the electric motor in a state where the rotation of the movable fin is prevented by the preventing means. As a result, a burnout of the electric motor, a breakage of the power transmission mechanism, the movable fin, and the like may occur.

A need thus exists for a drive unit for a movable member which is not susceptible to the drawback mentioned above.

SUMMARY

According to an aspect of this disclosure, a drive unit for a movable member includes the movable member adjusting aerodynamic characteristics of a vehicle while the movable member is changing a position thereof, an electric motor operating the movable member, a preventing device preventing the movable member from operating beyond a specified operating range by making contact with the movable member, and a controlling device supplying an electric power to the electric motor for a reference time and operating the movable member from a first end to a second end of the specified operating range, the controlling device correcting the reference time on the basis of an external factor that affects an operating speed of the movable member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
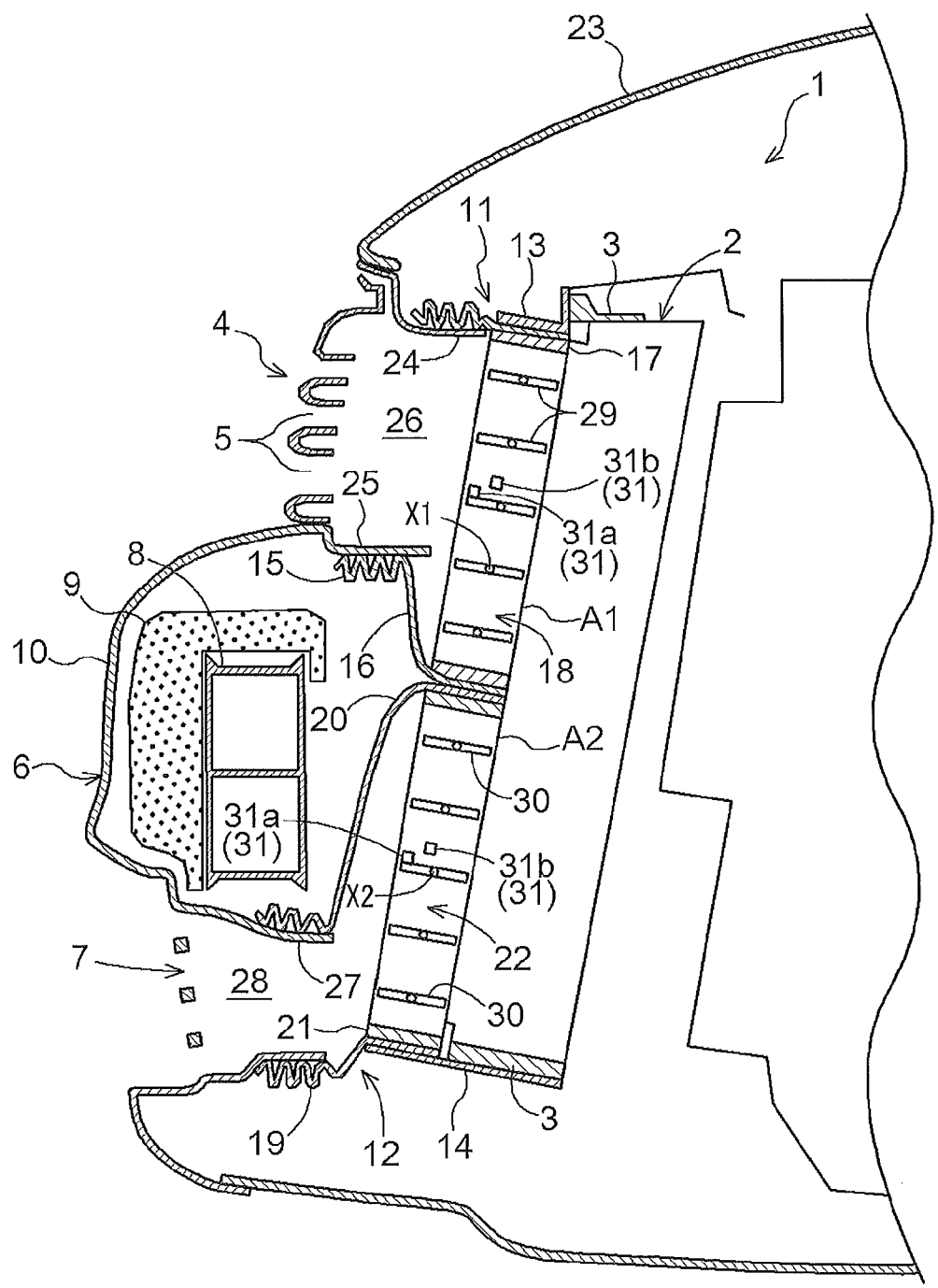
FIG. 1 is a cross-sectional view of an engine compartment for a vehicle according to first and second embodiments disclosed here.
Figure 2:
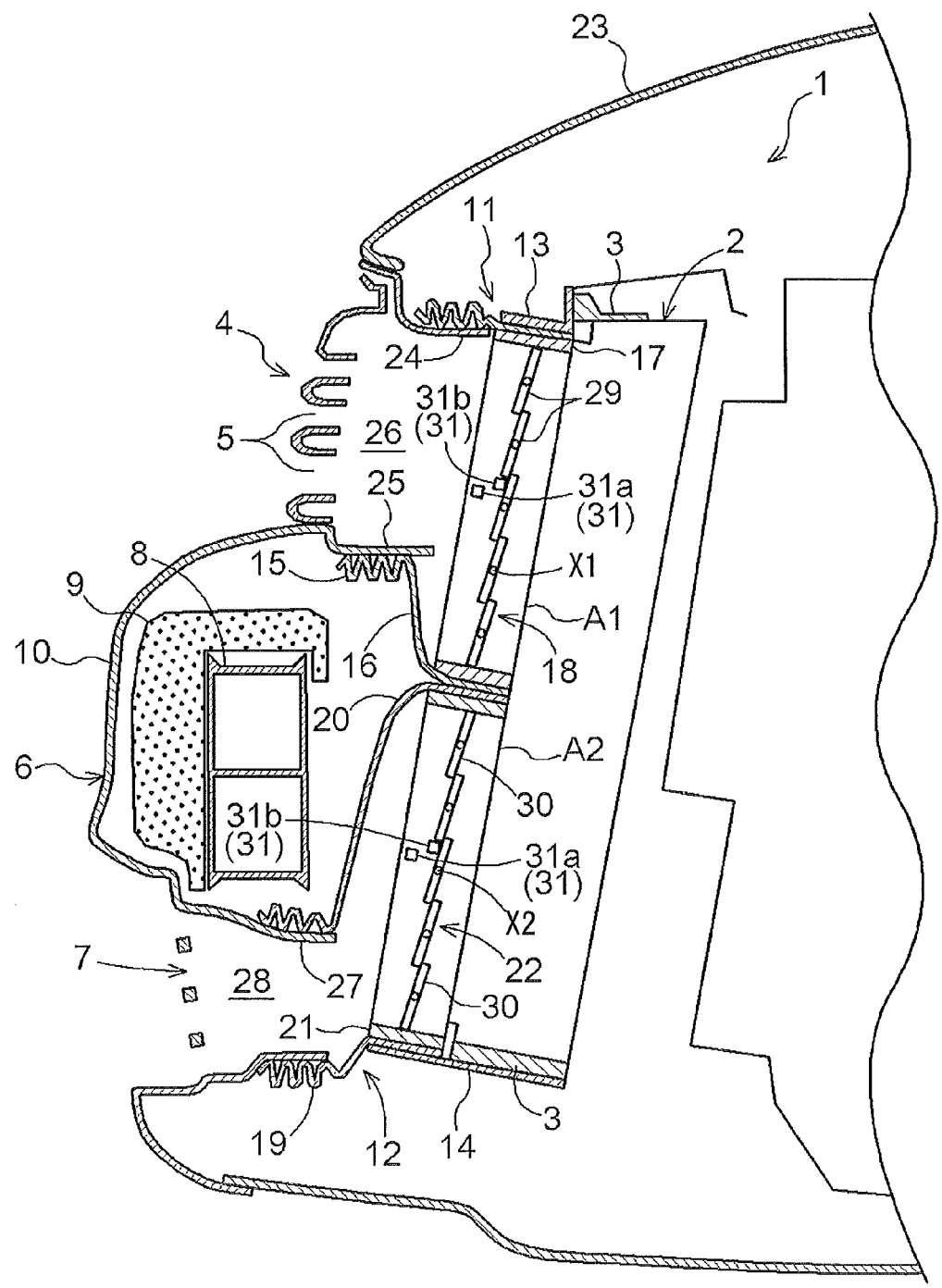
FIG. 2 is another cross-sectional view of the engine compartment according to the first and second embodiments disclosed here.

Embodiments disclosed here will be explained with reference to the attached drawings. As illustrated in FIGS. 1 and 2, an engine compartment 1 provided at a front portion of a vehicle accommodates a radiator 2 that cools an engine cooling water. The radiator 2 is attached to a vehicle body 3. In FIGS. 1 and 2, each leftward direction thereof corresponds to a front side of the vehicle while each rightward direction corresponds to a rear side of the vehicle.

An ornamental grille 4 is provided at a front side of the radiator 2. The ornamental grille 4 includes a first grille opening portion 5 opening and arranged above a bumper 6 and a second grille opening portion 7 opening and arranged below the bumper 6.

A bumper reinforcement member 8 is arranged between the first grille opening portion 5 and the second grille opening portion 7 at the front side of the radiator 2. The bumper reinforcement member 8 is attached to the vehicle body 3. A foam shock absorber 9 is provided at a front of the bumper reinforcement member 8. Then, a resin covering material 10 of the bumper 6 is provided to cover the shock absorber 9.

A first case 11 and a second case 12 are arranged, being adjoined to each other in front of the radiator 2 in such a manner that the first case 11 is positioned above the second case 12 in a vertical direction of the vehicle. The first case 11 and the second case 12 are attached to the vehicle body 3 via brackets 13 and 14, respectively.

The first case 11 includes a first body frame 16 of which an end is formed by a first bellows portion 15 and a first case frame 17 fixed to an inner side of the first body frame 16. Then, a first airflow passage 18 is formed at an inner side of the first case frame 17 so as to surround or cover the front upper portion of the radiator 2. The first airflow passage 18 is elongated in a width direction of the vehicle so as to have substantially a rectangular shape in a cross section (i.e., when viewed from a side of the vehicle).

The second case 12 includes a second body frame 20 of which an end is formed by a second bellows portion 19 and a second case frame 21 fixed to an inner side of the second body frame 20. Then, a second airflow passage 22 is formed at an inner side of the second case frame 21 so as to surround or cover the front lower portion of the radiator 2. The second airflow passage 22 is elongated in the width direction of the vehicle so as to have substantially a rectangular shape in a cross section (i.e., when viewed from a side of the vehicle).

A wall member 24 that extends from a hood surrounding member 23 is connected to an inner upper portion of the first bellows portion 15 while an upper wall 25 of the bumper 6 is connected to an inner lower portion of the first bellows portion 15. As a result, a first air inflow passage 26 is formed from the first grille opening portion 5 to the front upper portion of the radiator 2.

An opening end portion 27 formed at the second grille opening portion 7 is fitted to an inner portion of the second bellows portion 19. Accordingly, a second air inflow passage 28 is formed from the second grille opening potion 7 to the front lower portion of the radiator 2.

A first movable louver shutter device (a first shutter device) A1 and a second movable louver shutter device (a second shutter device) A2 each serving as an example of a drive unit for a movable member according to the embodiments are mounted at the first case frame 17 and the second case frame 21, respectively.

The first movable louver shutter device A1 includes multiple first movable fins 29, each serving as an example of the movable member, arranged within the first airflow passage 18 at intervals in a vertical direction of the vehicle. The first movable louver shutter device A1 also includes a direct current electric motor having a reduction gear (hereinafter referred to as a first motor) M1 (see FIG. 3) that drives the multiple first movable fins 29 to integrally rotate about respective lateral axes X1 thereof along the width direction of the vehicle.

The first movable fins 29 collectively rotate within a specified operating range that is defined between a fully open position (i.e., one of a first end and a second end) as illustrated in FIG. 1 where the air penetration from the first airflow passage 18 to the engine compartment 1 is permitted and a fully closed position (i.e., the other one of the first end and the second end) as illustrated in FIG. 2 where the air penetration to the engine compartment 1 is prohibited.

The rotation of the first movable fins 29 from the first end to the second end of the specified operating range achieves an adjustment of the air penetration to the engine compartment 1 from the front portion of the vehicle through the first air inflow passage 26.

The second movable louver shutter device A2 includes multiple second movable fins 30, each serving as an example of the movable member, arranged within the second airflow passage 22 at intervals in the vertical direction of the vehicle. The second movable louver shutter device A2 also includes a direct current electric motor having a reduction gear (hereinafter referred to as a second motor) M2 (see FIG. 3) that drives the multiple second movable fins 30 to integrally rotate about respective lateral axes X2 thereof along the width direction of the vehicle.

Both ends of each of the first movable fins 29 in the width direction of the vehicle are rotatably supported by both side portions of the first case frame 17 in the width direction. In addition, both ends of each of the second movable fins 30 in the width direction of the vehicle are rotatably supported by both side portions of the second case frame 21 in the width direction. The first motor M1 and the second motor M2 are both driven by a battery serving as a driving power source mounted on the vehicle.

The second movable fins 30 collectively rotate within a specified operating range that is defined between a fully open position (i.e., one of a first end and a second end) as illustrated in FIG. 1 where the air penetration from the second airflow passage 22 to the engine compartment 1 is permitted and a fully closed position (i.e., other of the first end and the second end) as illustrated in FIG. 2 where the air penetration to the engine compartment 1 is prohibited.

The rotation of the second movable fins 30 from the first end to the second end of the specified operating range achieves an adjustment of the air penetration to the engine compartment 1 from the front portion of the vehicle through the second air inflow passage 28.

Preventing means 31 serving as preventing devices are provided in a projecting manner at one of the side portions of the first case frame 17. The preventing means 31 prevent all of the first movable fins 29 from operating beyond the specified operating range by making contact with one of the first movable fins 29. In the same way, the preventing means 31 are provided in a projecting manner at one of the side portions of the second case frame 21. The preventing means 31 prevent all of the second movable fins 30 from operating beyond the specified operating range by making contact with one of the second movable fins 30.

The preventing means 31 include first preventing devices 31a and second preventing devices 31b. The first preventing devices 31a make contact with one of the first movable fins 29 in the fully open position and/or one of the second movable fins 30 in the fully open position to thereby prevent all of the first movable fins 29 and/or all of the second movable fins 30 from moving beyond the fully open position. The second preventing devices 31b make contact with one of the first movable fins 29 in the fully closed position and/or one of the second movable fins 30 in the fully closed position to thereby prevent all of the first movable fins 29 and/or all of the second movable fins 30 from moving beyond the fully closed position.

The first movable fins 29 being collectively in the fully open position are arranged at horizontal angular positions and in parallel to one another as illustrated in FIG. 1 to thereby open the first airflow passage 18. In the same manner, the second movable fins 30 being collectively in the fully open position are arranged at horizontal angular positions and in parallel to one another as illustrated in FIG. 1 to thereby open the second airflow passage 22.

The first movable fins 29 being collectively in the closed position are arranged at angular positions where end portions of the first movable fins 29 adjacent to each other are positioned close to each other as illustrated in FIG. 2 to thereby close the first airflow passage 18. In the same manner, the second movable fins 30 being collectively in the closed position are arranged at angular positions where end portions of the second movable fins 30 adjacent to each other are positioned close to each other as illustrated in FIG. 2 to thereby close the second airflow passage 22.

The first movable fins 29 provided at the first movable louver shutter device A1 are separately or individually driven to rotate to one of the fully open position and the fully closed position from the second movable fins 30 that are provided at the second movable louver shutter device A2 and driven to rotate to one of the fully open position and the fully closed position. For example, the first movable fins 29 are rotated to the fully closed position while the second movable fins 30 are rotated to the fully open position, thereby adjusting the air penetration to the engine compartment 1 from the front portion of the vehicle in the driving state.

As mentioned above, the first movable fins 29 and the second movable fins 30 are examples of the movable members that adjust aerodynamic characteristics of the vehicle while the first movable fins 29 and the second movable fins 30 are changing their positions. The first movable fins 29 and the second movable fins 30 adjust the air penetration to the engine compartment 1 from the front portion of the vehicle to thereby apply an air resistance, a lift force, or a down force to the vehicle that is being driven. The stable driving state of the vehicle is ensured accordingly.

That is, in a case where the first movable fins 29 and the second movable fins 30 are all rotated to the fully closed position, the air resistance (i.e., air resistance coefficient) and the lift force are reduced. In addition, air in front of the vehicle flows beneath a floor surface of the vehicle, thereby generating the down force for pulling the vehicle downward.

In addition, in a case where the first movable fins 29 and the second movable fins 30 are all rotated to the fully open position, the air resistance increases and a pressure within the engine compartment 1 increases because of air inflowing thereto, thereby increasing the lift force.

In a case where the vehicle is driven at a predetermined speed, a combination of the positions of the first movable fins 29 (i.e., the fully closed position or the fully open position) and the second movable fins 30 (i.e., the fully closed position or the fully open position) is appropriately changed to thereby adjust the air resistance, the magnitude of lift force and down force, and the like.

Figure 3:
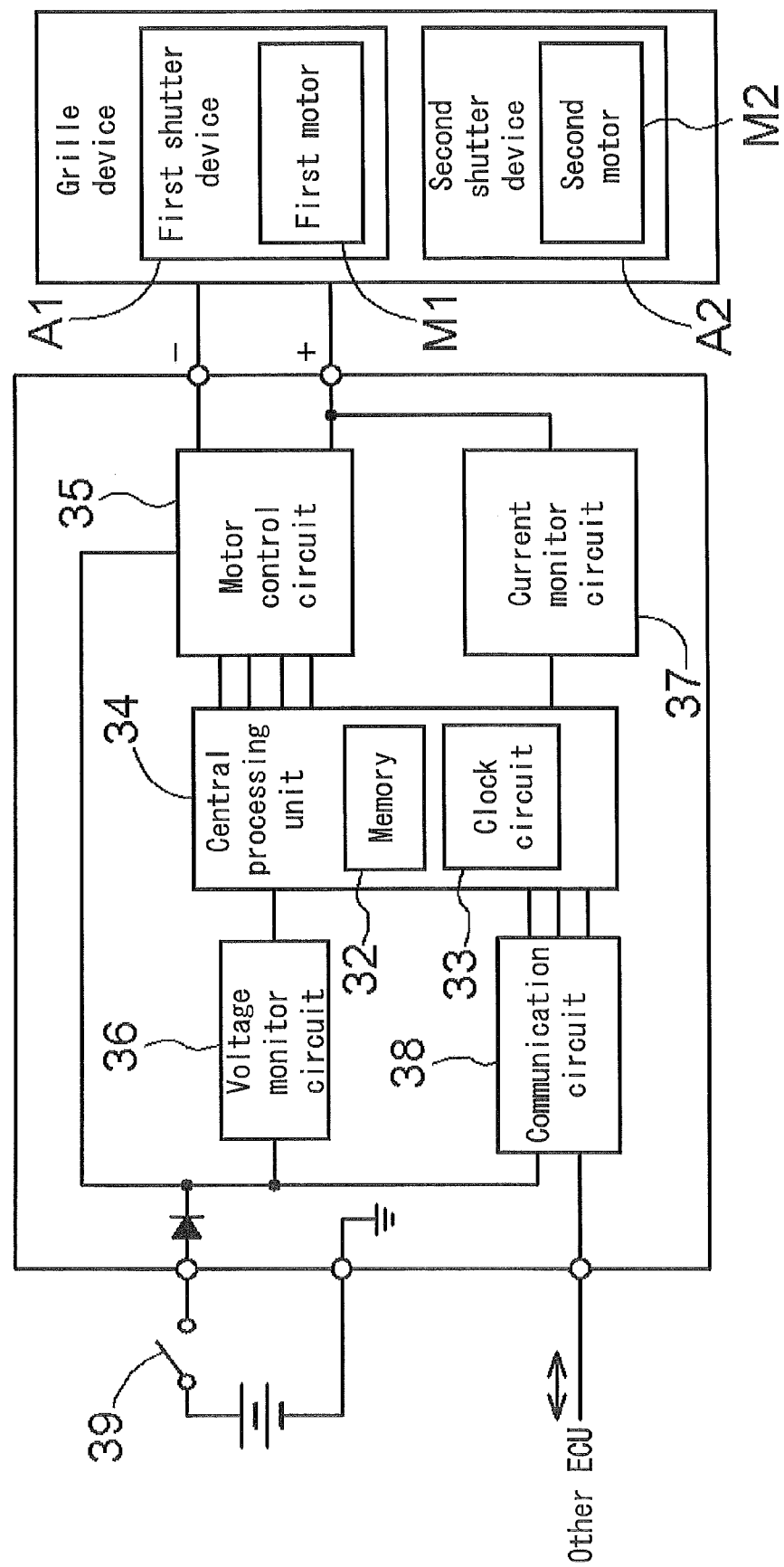
FIG. 3 is a block diagram of a control unit (controlling means) according to the first and second embodiments disclosed here.

FIG. 3 is a block diagram of a control unit B that serves as a controlling device and controlling means and that controls operations of the first motor M1 of the first movable louver shutter device A1 and the second motor M2 of the second movable louver shutter device A2.

The control unit B includes a central processing unit 34, a motor control circuit 35, a voltage monitor circuit 36, a current monitor circuit 37, and a communication circuit 38. The central processing unit 34 includes a memory 32 and a clock circuit 33. The motor control circuit 35 individually or separately controls the operations of the first motor M1 and the second motor M2. The voltage monitor circuit 36 monitors a voltage of an operational power source (i.e., a battery) for the first and second movable louver shutter devices A1 and A2. The current monitor circuit 37 monitors the electric current flowing to the first motor M1 and the electric current flowing to the second motor M2, individually or separately. The communication circuit 38 inputs vehicle information such as a driving speed, an outside air temperature, and a cooling water temperature at the radiator 2. In a case where an ignition switch 39 is turned on, the control unit B performs a predetermined control operation per predetermined time period or per predetermined driving distance of the vehicle.

In order to bring the cooling water temperature to be equal to or smaller than a specified temperature, the central processing unit 34 transmits to the motor control circuit 35 an operation instruction for operating the first motor M1 and/or the second motor M2 to rotate the first movable fins 29 and/or the second movable fins 30 based on the cooling water temperature input to the communication circuit 38. The central processing unit 34 also transmits a corrected reference time T (which will be explained later) along with the operation instruction to the motor control circuit 35.

With a precondition of the cooling water temperature equal to or smaller than the specified temperature, the central processing unit 34 adjusts the air penetration to the engine compartment 1 from the front portion of the vehicle so as to apply the air resistance, the lift force, or the down force to the vehicle based on the driving speed input to the communication circuit 38. That is, the central processing unit 34 transmits to the motor control circuit 35 the operation instruction to operate the first motor M1 and/or the second motor M2 in addition to the corrected reference time T.

The motor control circuit 35, which receives the operation instruction and the corrected reference time T from the central processing unit 34, supplies the electric power to the first motor M1 and/or the second motor M2 for the corrected reference time T to thereby perform the motor control for rotating the first movable fins 29 and/or the second movable fins 30 from the first end to the second end.

That is, the central processing unit 34 outputs the operation instruction, together with the corrected reference time T, to the motor control circuit 35 so as to rotate one of or both of the first movable fins 29 and the second movable fins 30 to the fully closed position as necessary in a case where the first movable fins 29 and/or the second movable fins 30 are in the fully open position. In addition, the central processing unit 34 outputs the operation instruction, together with the corrected reference time T, to the motor control circuit 35 so as to rotate one of or both of the first movable fins 29 and the second movable fins 30 to the fully open position as necessary in a case where the first movable fins 29 and/or the second movable fins 30 are in the fully closed position.

The central processing unit 34 stores, in the memory 32 beforehand, a specified reference time TX (a reference time) that is not corrected and a corrective program for correcting the specified reference time TX based on an external factor that affects the operating speed of the first movable fins 29 and/or the second movable fins 30. Upon the transmission of the operation instruction to the motor control circuit 35, the corrected reference time T resulting from the correction on the specified reference time TX is together transmitted to the motor control circuit 35.

Figure 4:
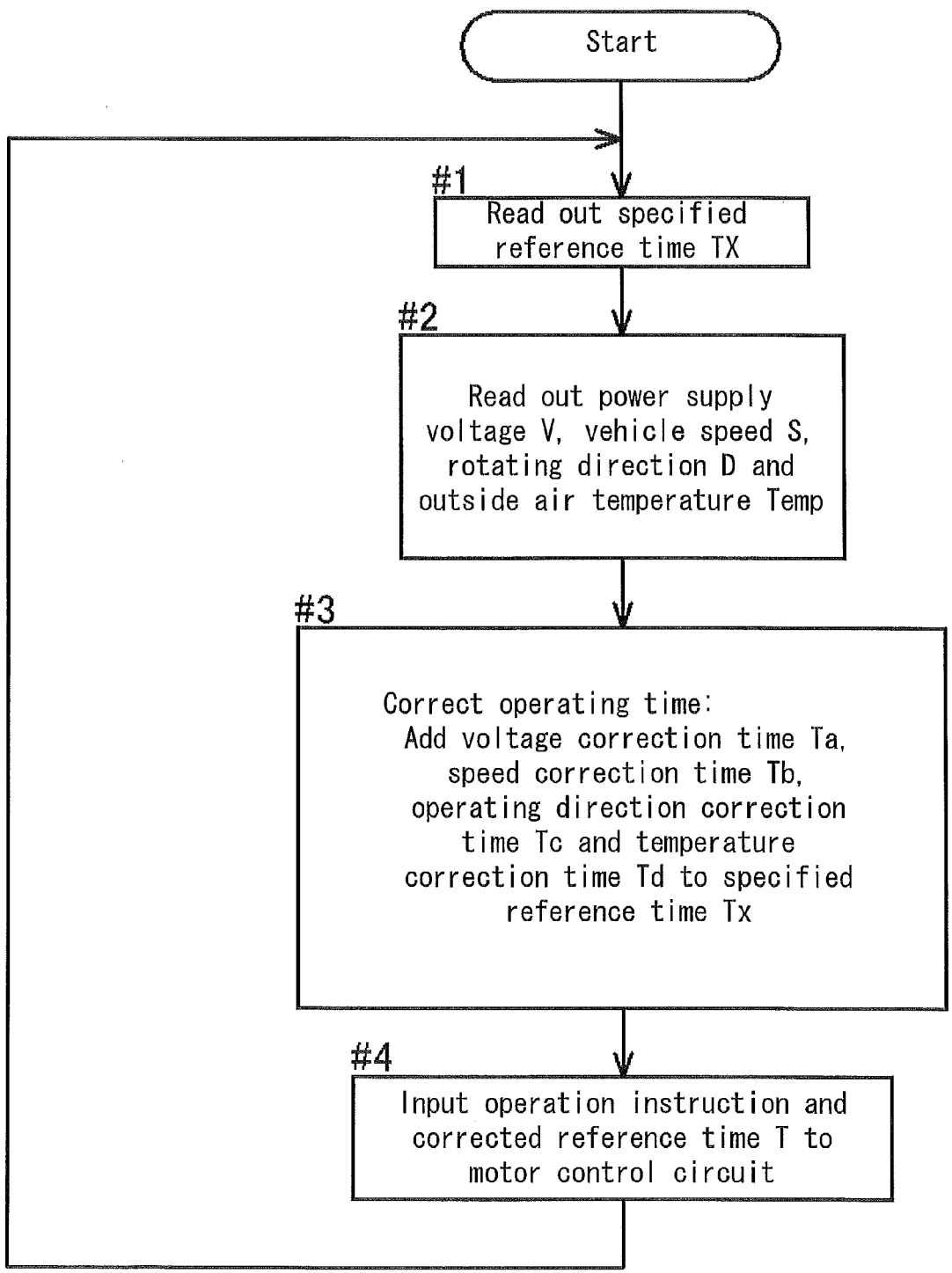
FIG. 4 is a flowchart illustrating a control by a central processing unit according to the first embodiment disclosed here.

The correction of the specified reference time TX will be explained with reference to a flowchart shown in FIG. 4. In #1, the specified reference time TX is read out. Then, in #2, the external factor including a power supply voltage V monitored by the voltage monitor circuit 36, a driving speed of the vehicle (i.e., a vehicle speed) S input to the communication circuit 38, a rotating direction D of the first movable fins 29 (the second movable fins 30), and an outside air temperature Temp input to the communication circuit 38 is read out. In #3, the specified reference time TX is corrected by the corrective program. Then, the resulting corrected reference time T in addition to the operation instruction is transmitted to the motor control circuit 35 in #4.

The corrected reference time T is calculated by adding a voltage correction time Ta, a speed correction time Tb, an operating direction correction time Tc and a temperature correction time Td to the specified reference time TX.

A correlation between the power supply voltage V and the voltage correction time Ta, a correlation between the vehicle speed S and the speed correction time Tb, a correlation between the rotating direction D of the first movable fins 29 (the second movable fins 30) and the operating direction correction time Tc, and a correlation between the outside air temperature Temp and the temperature correction time Td are all stored in the memory 32 beforehand.

Figure 5:
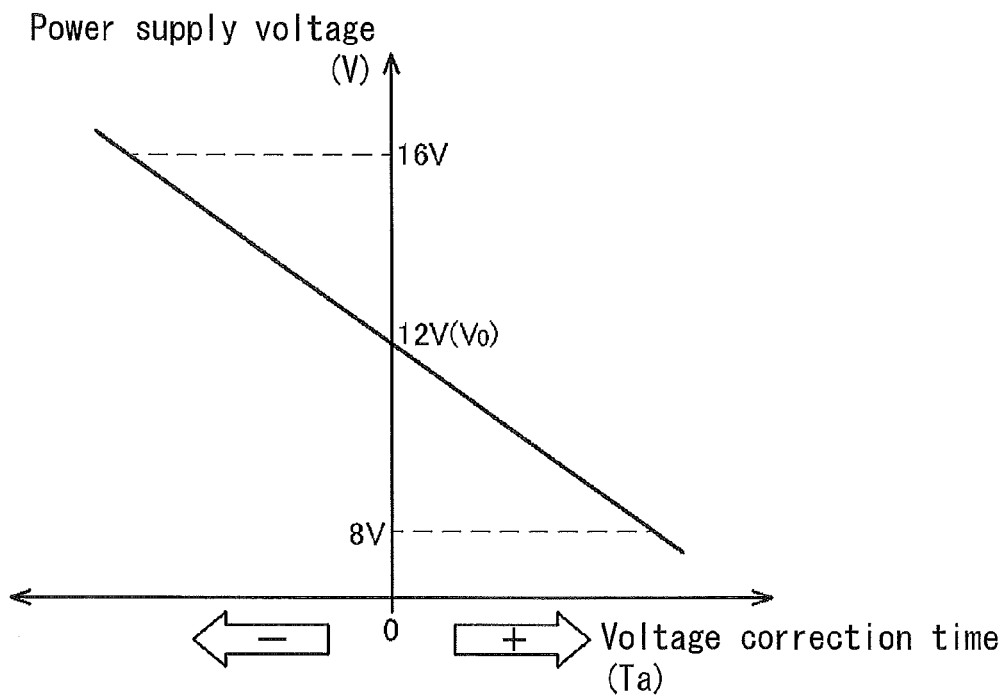
FIG. 5 is a graph illustrating a correlation between a power supply voltage and a voltage correction time according to the first embodiment disclosed here.

FIG. 5 is a graph illustrating the correction between the power supply voltage V and the voltage correction time Ta and where 12V serves as a reference voltage $V_0$. In a case where the power supply voltage V is greater than the reference voltage $V_0$, the voltage correction time Ta with the minus sign increases in direct proportion to a difference between the power supply voltage V and the reference voltage $V_0$. In a case where the power supply voltage V is smaller than the reference voltage $V_0$, the voltage correction time Ta with the plus sign increases in direct proportion to a difference between the reference voltage $V_0$ and the power supply voltage V.

Therefore, in a case where the power supply voltage V is greater than the reference voltage $V_0$ and thus a time period required for the first movable fins 29 (the second movable fins 30) to rotate from the first end to the second end of the specified operating range decreases, the correction is made to achieve the corrected reference time T that is reduced. On the other hand, in a case where the power supply voltage V is smaller than the reference voltage $V_0$ and thus a time period required for the first movable fins 29 (the second movable fins 30) to rotate from the first end to the second end of the specified operating range increases, the correction is made to achieve the corrected reference time T that is elongated.

Figure 6:
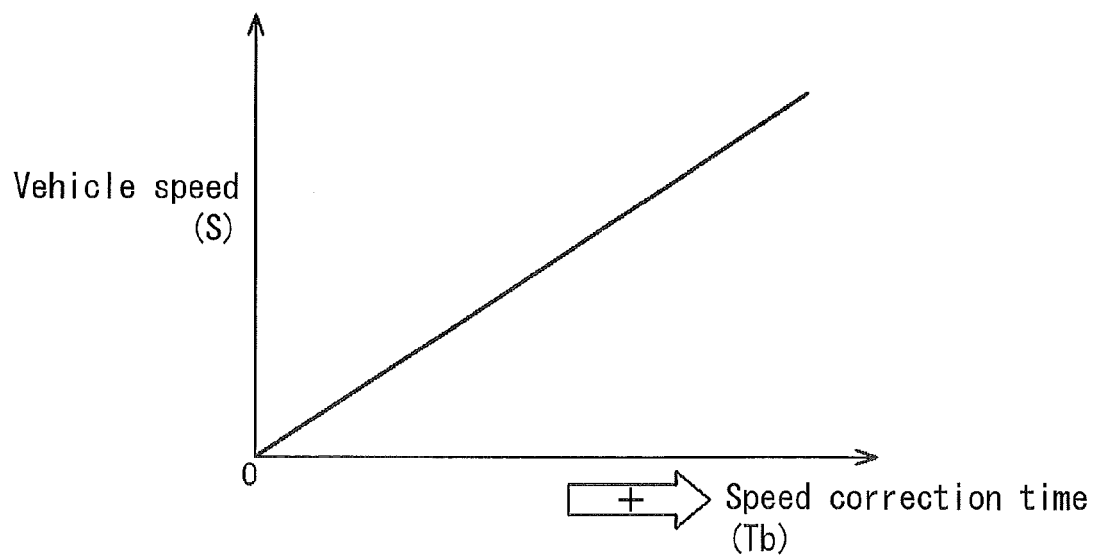
FIG. 6 is a graph illustrating a correlation between a vehicle speed and a speed correction time according to the first embodiment disclosed here.

FIG. 6 is a graph illustrating the correlation between the vehicle speed S and the speed correction time Tb. The speed correction time Tb with the plus sign increases in direct proportion to the vehicle speed S. That is, when the vehicle speed S increases and thus a time period for rotating the first movable fins 29 (the second movable fins 30) from the first end to the second end of the specified operating range increases, the correction is made to achieve the corrected reference time T that is elongated.

The operating direction correction time Tc is a time period used for the correction of the specified reference time TX_in a case where an operating time of the first movable fins 29 (the second movable fins 30) from the fully open position to the fully closed position or vice versa increases in direct proportion to the vehicle speed S depending on operating characteristics specific to the first movable fins 29 (the second movable fins 30).

Figure 7:
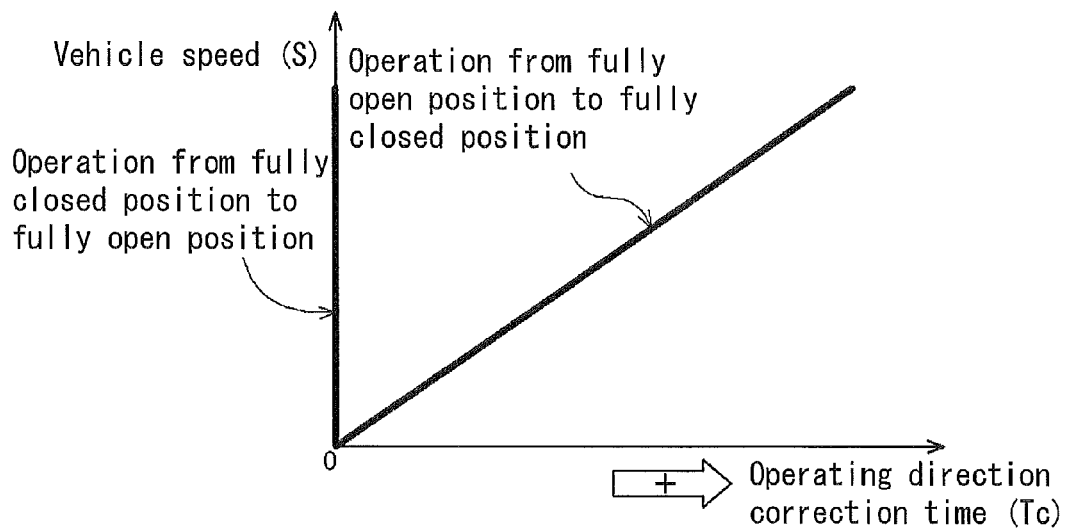
FIG. 7 is a graph illustrating a correlation between the vehicle speed and an operating direction correction time according to the first embodiment disclosed here.

FIG. 7 is a graph illustrating a correlation between the vehicle speed S and the operating direction correction time Tc in a case where the operating time of the first movable fins 29 (the second movable fins 30) from the fully open position to the fully closed position is longer than that from the fully closed position to the fully open position. When the first movable fins 29 (the second movable fins 30) operate from the fully open position to the fully closed position, the operating direction correction time Tc with the plus sign increases in direct proportion to the vehicle speed S. On the other hand, when the first movable fins 29 (the second movable fins 30) operate from the fully closed position to the fully open position, the operating direction correction time Tc is zero regardless of the vehicle speed S.

Accordingly, when the first movable fins 29 (the second movable fins 30) operate from the fully open position to the fully closed position, the correction is made to achieve the corrected reference time T that is elongated in association with the increase of the vehicle speed S. When the first movable fins 29 (the second movable fins 30) operate from the fully closed position to the fully open position, the correction is not substantially performed on the specified reference time TX resulting from the operating direction of the first movable fins 29 (the second movable fins 30).

Figure 8:
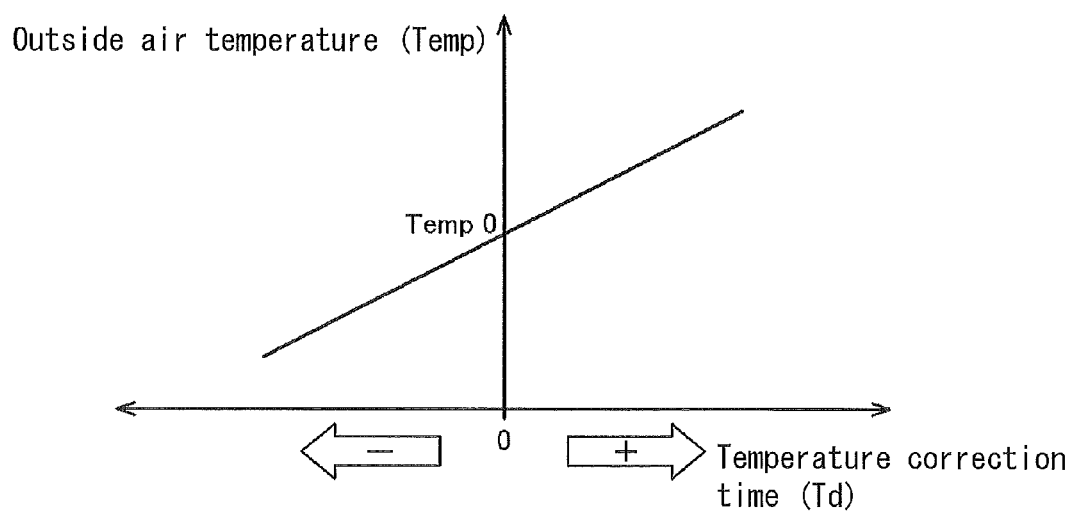
FIG. 8 is a graph illustrating a correlation between an outside air temperature and a temperature correction time according to the first embodiment disclosed here.

FIG. 8 is a graph illustrating the correlation between the outside air temperature Temp and the temperature correction time Td. When the outside air temperature Temp increases relative to the reference temperature $Temp_0$, the magnetic flux density, where an armature coil of the first motor M1 (the second motor M21 passes over, decreases. As a result, a rotating torque of the first motor M1 (the second motor M2) decreases and therefore the temperature correction time Td with the plus sign increases in direct proportion to a difference between the outside air temperature Temp and the reference temperature $Temp_0$. On the other hand, when the outside air temperature Temp decreases relative to the reference temperature $Temp_0$, the magnetic flux density, where the armature coil passes over, increases. As a result, the rotating torque of the first motor M1 (the second motor M2) increases and therefore the temperature correction time Td with the minus sign increases in direct proportion to a difference between the reference temperature $Temp_0$ and the outside air temperature Temp.

Accordingly, in a case where the outside air temperature Temp is greater than the reference temperature $Temp_0$ and a time period for the first movable fins 29 (the second movable fins 30) to rotate from the first end to the second of the specified operating range increases, the correction is made to achieve the corrected reference time T that is elongated. On the other hand, in a case where the outside air temperature Temp is smaller than the reference temperature $Temp_0$ and the time period for the first movable fins 29 (the second movable fins 30) to rotate from the first end to the second of the specified operating range decreases, the correction is made to achieve the corrected reference time T that is reduced.

A drive unit for a movable member according to a second embodiment will be explained below. According to the second embodiment, a reference time H is determined or corrected on the basis of the vehicle speed S serving as the external factor that affects the operation speed of the first movable fins 29 (the second movable fins 30).

Figure 9:
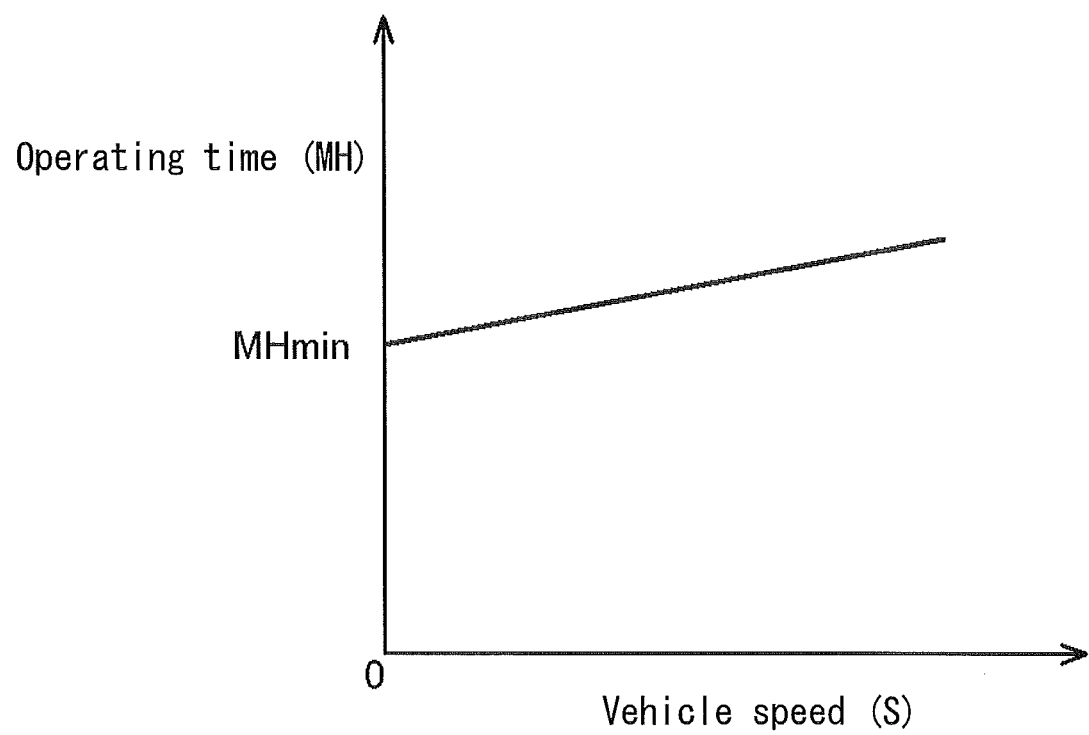
FIG. 9 is a graph illustrating a vehicle speed and an operating time according to the second embodiment disclosed here.

As illustrated in FIG. 9, the control unit B stores, in the memory 32 of the central processing unit 34, a correlation map between the vehicle speed S and an operating time MH of the first movable fins 29 (the second movable fins 30) that operate from the first end to the second end of the specified operating range depending on the vehicle speed S. The reference time H is determined on the basis of the correlation map.

According to the second embodiment, the operating time MH obtained when the vehicle is stopped, i.e., when the vehicle speed S is zero, serves as a minimum operating time MHmin. The operating time MH increases in direct proportion to the vehicle speed S in association with the increase of the vehicle speed S. The operating time MH corresponding to the present vehicle speed S is defined or determined to be the reference time H. The other structure of the second embodiment is the same as the structure of the first embodiment.

According to the aforementioned embodiments, the specified reference time TX is corrected to obtain the corrected reference time T that is reduced in a case where the operating speed of the movable fins 29, 30 increases, and the specified reference time TX is corrected to obtain the corrected reference time T that is elongated in a case where the operating speed of the movable fins 29, 30 decreases, on the basis of the external factor that affects the operating speed of the movable fins 29, 30. The movable fins 29, 30 are operated from the first end to the second end of the specified operating range by the power supply to the motor M1, M2 for the corrected reference time T resulting from the correction of the specified reference time TX. Accordingly, while the movable fins 29, 30 are operated from the first end to the second end of the specified operating range without an installation of a sensor, a time period for supplying the electric power (power supply time) to the motor M1, M2 is reduced in a state where the operations of the movable fins 29, 30 are prevented, thereby decreasing a stress that may occur in the movable louver shutter device A1, A2.

In addition, the movable member includes the movable fins 29, 30 adjusting the air penetration to the engine compartment 1 from the front portion of the vehicle, and the specified operating range is defined between the fully closed position where the air penetration is prohibited and the fully open position where the air penetration is permitted.

Accordingly, a stress that may occur in the movable louver shutter device A1, A2 for the movable fins 29, 30 that adjust the air penetration to the engine compartment 1 from the front portion of the vehicle may be reduced.

Further, the external factor includes the power supply voltage V of the motor M1, M2, and the control unit B performs a correction to decrease the specified reference time TX in a case where the power supply voltage V is greater than the reference voltage $V_0$ and performs a correction to increase the specified reference time TX in a case where the power supply voltage V is smaller than the reference voltage $V_0$.

Accordingly, in a case where the power supply voltage V is greater than the reference voltage $V_0$ and thus the operating speed of the movable fins 29, 30 driven by the motor M1, M2 is slow, and in a case where the power supply voltage V is smaller than the reference voltage $V_0$ and thus the operating speed of the movable fins 29, 30 driven by the motor M1, M2 is fast, the specified reference time TX is appropriately corrected so as to achieve the reduction of the power supply time of the motor M1, M2 while the operations of the movable fins 29, 30 are being prevented.

Furthermore, the control device B includes the correlation map between the vehicle speed S and the operating time MH of the movable fins 29, 30 depending on the vehicle speed over the specified operating range, and the reference time H is determined on the basis of the correlation map.

Thus, the operating time MH of the movable fins 29, 30 in connection with the present driving speed of the vehicle (i.e., the vehicle speed S) is obtained from the correlation map. The thus obtained operating time MH is determined to be the reference time H accordingly. In a case where the operating time MH of the movable fins 29, 30 over the specified operating range varies depending on the vehicle speed S, the reference time H is appropriately corrected or determined so as to achieve the reduction of the power supply time of the motor M1, M2 while the operations of the movable fins 29, 30 are being prevented.

Furthermore, the external factor includes the outside air temperature Temp, and the control unit B performs a correction to increase the specified reference time TX in a case where the outside air temperature Tem is greater than the reference temperature $Temp_0$ and performs a correction to decrease the specified reference time TX in a case where the outside air temperature is smaller than the reference temperature $Temp_0$.

The magnetic flux density where the armature coil of the motor M1, M2 passes over decreases along with the increase of the outside air temperature Temp. Thus, the rotating torque generated at the armature coil decreases, thereby increasing the operating time of the movable fins 29, 30 over the specified operating range. Then, according to the embodiments, the specified reference time TX is corrected to obtain the corrected reference time T that is elongated when the rotating torque of the motor M1, M2 decreases because of the higher outside air temperature Temp than the reference temperature $Temp_0$ and the specified reference time TX is corrected to obtain the corrected reference time T that is reduced when the rotating torque of the motor M1, M2 increases because of the lower outside air temperature Temp than the reference temperature $Temp_0$. Consequently, on the basis of variations of the operating time of the movable fins 29, 30 over the specified operating range caused by the outside air temperature Temp, the specified reference time TX is appropriately corrected so that the power supply time of the motor M1, M2 is reduced in a state where the operations of the movable fins 29, 30 are prevented.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A drive unit for a movable member, comprising:
   the movable member being rotatably mounted to rotate in one direction of rotation and in an opposite direction of rotation to rotate between a first end of a rotation range of the movable member and a second end of the rotation range to adjust aerodynamic characteristics of a vehicle,
   an electric rotation motor operatively connected to the movable member so that operation of the electric rotation motor rotates the movable member between the first and second ends of the rotation range;
   a preventing device contacted by the movable member rotating in the one direction to prevent the movable member from rotating beyond the first end of the rotation range and contacted by the movable member rotating in the opposite direction to prevent the movable member from rotating beyond the second end of the rotation range; and a controlling device supplying electric power to the electric motor for a reference time to rotate the movable member between the first and second ends, the controlling device being configured to change the reference time and supply the electric power to the electric motor for a time different than the reference time based on an external factor affecting an operating speed of the movable member.

2. The drive unit according to claim 1, wherein the movable member includes a movable fin adjusting an air penetration to an engine compartment from a front portion of the vehicle, and the rotation range is defined between a fully closed position where the air penetration is prohibited and a fully open position where the air penetration is permitted.

3. The drive unit according to claim 1, wherein the external factor includes a power supply voltage of the electric rotation motor, and the controlling device performs a correction to decrease the reference time in a case where the power supply voltage is greater than a reference voltage and performs a correction to increase the reference time in a case where the power supply voltage is smaller than the reference voltage.

4. The drive unit according to claim 1, wherein the controlling device includes a correlation map between a driving speed of the vehicle and an operating time of the movable member depending on the driving speed of the vehicle over the rotation range, and the reference time is determined on the basis of the correlation map.

5. The drive unit according to claim 1, wherein the external factor includes an outside air temperature, and the controlling device performs a correction to increase the reference time in a case where the outside air temperature is greater than a reference temperature and performs a correction to decrease the reference time in a case where the outside air temperature is smaller than the reference temperature.

6. The drive unit according to claim 1, wherein the movable member at the first end and the second end opens and closes fully an air passage.

* * * * *